United States Patent
Duffy et al.

(10) Patent No.: US 8,570,884 B2
(45) Date of Patent: Oct. 29, 2013

(54) METHOD AND APPARATUS FOR ENABLING CUSTOMER PREMISE PUBLIC BRANCH EXCHANGE SERVICE FEATURE PROCESSING

(75) Inventors: Dennis Duffy, Decatur, GA (US);
Leticia D. Johnson, Helotes, TX (US);
Myranda Johnson, Smyrna, GA (US);
Stephanie P. Parlamas, Colts Neck, NJ (US); Steven A. Siegel, Mendham, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 836 days.

(21) Appl. No.: 12/611,859

(22) Filed: Nov. 3, 2009

(65) Prior Publication Data

US 2010/0111076 A1    May 6, 2010

Related U.S. Application Data

(60) Provisional application No. 61/100,800, filed on Nov. 3, 2008.

(51) Int. Cl.
*H04L 12/66*    (2006.01)
(52) U.S. Cl.
USPC .......................................... 370/252

(58) Field of Classification Search
None
See application file for complete search history.

(56) References Cited

U.S. PATENT DOCUMENTS

| | | | |
|---|---|---|---|
| 2006/0025140 A1* | 2/2006 | Bales et al. | 455/445 |
| 2007/0206613 A1* | 9/2007 | Silver et al. | 370/401 |
| 2009/0086742 A1* | 4/2009 | Ghai et al. | 370/401 |
| 2009/0116634 A1* | 5/2009 | Levin et al. | 379/221.01 |

\* cited by examiner

*Primary Examiner* — Minh-Trang Nguyen

(57) ABSTRACT

A method and apparatus for enabling customer premise Public Branch eXchange (PBX) service feature processing to be performed in a service provider network using an intermediary device are disclosed. For example, the method receives a signaling message by an intermediary device managed by a service provider of a communication network, where the signaling message requires processing by a customer premise Public Branch eXchange (PBX), wherein the signaling message is in accordance with a network signaling format. The method interworks the signaling message into a signaling message in accordance with a PBX signaling format, and sends the interworked signaling message to the customer premise PBX to retrieve service logic and data associated with the signaling message.

20 Claims, 4 Drawing Sheets

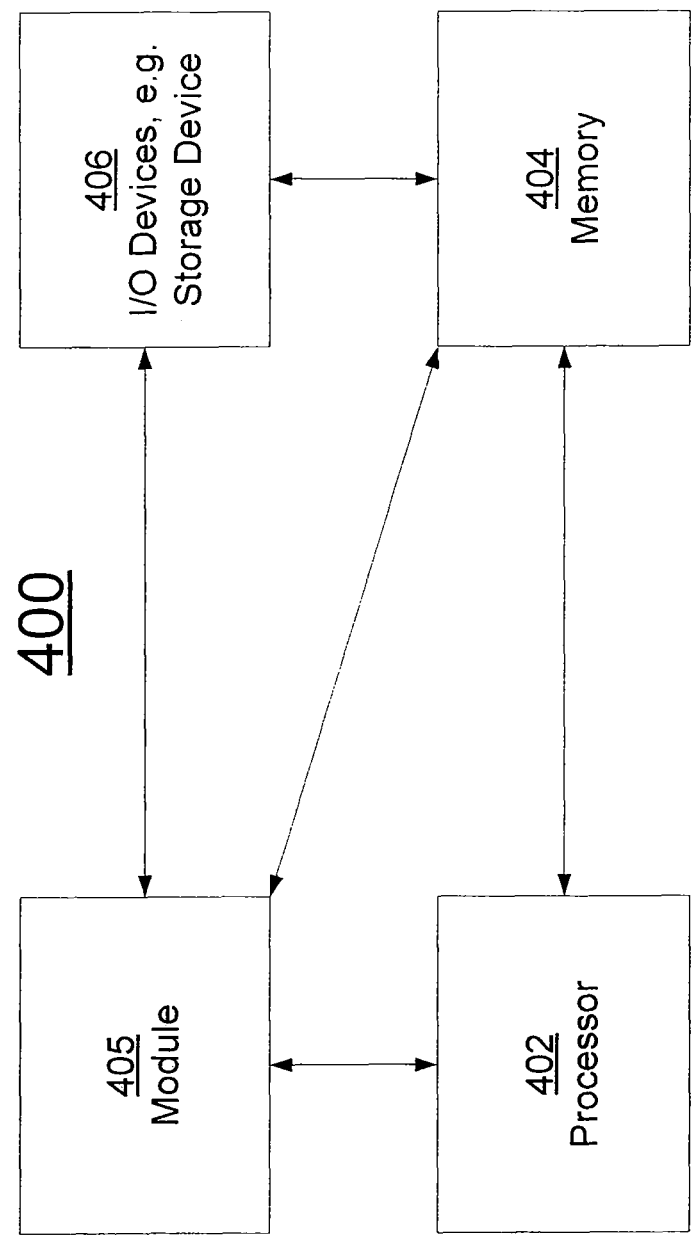

US 8,570,884 B2

METHOD AND APPARATUS FOR ENABLING CUSTOMER PREMISE PUBLIC BRANCH EXCHANGE SERVICE FEATURE PROCESSING

This application claims the benefit of U.S. Provisional Application No. 61/110,800 filed on Nov. 3, 2008, which is herein incorporated by reference.

The present invention relates generally to communication network and, more particularly, to a method and apparatus for enabling customer premise Public Branch eXchange (PBX) service feature processing to be performed in a service provider network using a PBX intermediary device.

BACKGROUND OF THE INVENTION

Existing customer premise Public Branch Exchanges (PBXs) do not support an interface that can communicate local service logic and data to a service provider network. As such, customer premise PBXs do not enable the integration of network based service features provided by a service provider and customer premises based PBX service features supported by a customer premise PBX.

SUMMARY OF THE INVENTION

In one embodiment, the present invention discloses a method and apparatus for enabling customer premise Public Branch eXchange (PBX) service feature processing to be performed in a service provider network using an intermediary device. For example, the method receives a signaling message by an intermediary device managed by a service provider of a communication network, where the signaling message requires processing by a customer premise Public Branch eXchange (PBX), wherein the signaling message is in accordance with a network signaling format. The method interworks the signaling message into a signaling message in accordance with a PBX signaling format, and sends the interworked signaling message to the customer premise PBX to retrieve service logic and data associated with the signaling message.

BRIEF DESCRIPTION OF THE DRAWINGS

The teaching of the present invention can be readily understood by considering the following detailed description in conjunction with the accompanying drawings, in which:

FIG. 4 illustrates a high level block diagram of a general purpose computer suitable for use in performing the functions described herein.

To facilitate understanding, identical reference numerals have been used, where possible, to designate identical elements that are common to the figures.

DETAILED DESCRIPTION

There is no current method for using information resident in a customer premise-based PBX by the network service provider to provide IMS services. For example, current Fixed Mobile Convergence (FMC) solutions may not result in the efficient use of an enterprise customer's access interface. They do not allow the Service Provider network the ability to access complementary and value-added features available from a customer premise PBX. Moreover, existing customer premise PBXs do not support an interface that can communicate local service logic and data to a service provider network. Thus, existing customer premise PBXs do not enable the integration of network based FMC service features provided by a service provider and customer premises based PBX service features supported by a customer premise PBX.

To address this criticality, the present invention enables a service provider network to access customer premise PBX based service features via a PBX intermediary device (PID) (broadly an intermediary device) during call processing. This approach provides a network based Fixed Mobile Convergence (NB-FMC) service that integrates both customer premise-based and network-based service features across wireless and wireline devices, while making efficient use of the enterprise customer's access interface.

In one embodiment, the present invention provides an interface between a service provider network and a PID to allow access to the customer premise PBX based service logic and data without relinquishing control of the bearer path of a call. In other words, the present invention enables communications with a customer premise PBX via a PID, acting as a SIP AS to the IMS Core, to achieve integrated premise based and network based service features and more efficient use of the enterprise customer access interface. The PID provides the necessary interworking between the service provider network and a customer premise PBX, that does not support a direct AS interface using Session Initiation Protocol (SIP), to facilitate the access of customer premise PBX service logic and data by the service provider network.

Figure 1:
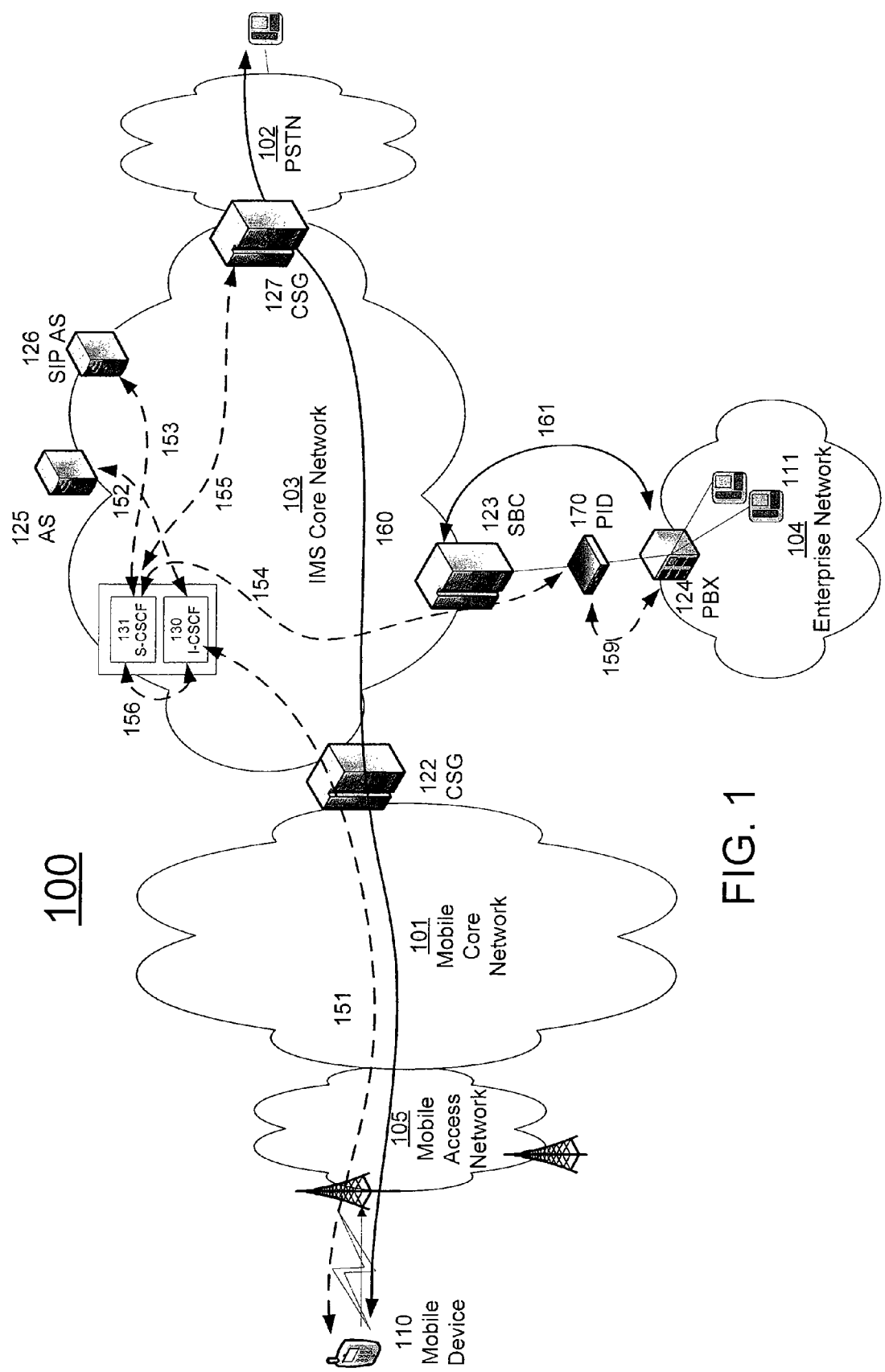
FIG. 1 illustrates an exemplary network for enabling customer premise PBX service feature processing in a service provider network using a PBX intermediary device in accordance with one embodiment of the present invention.

FIG. 1 illustrates an exemplary network 100 for enabling customer premise PBX service feature processing in a service provider network using a PBX intermediary device in accordance with one embodiment of the present invention. In FIG. 1, a Mobile Core Network 101 is connected to an IMS Core Network 103 via a Circuit Switched Gateway (CSG) 122.

Broadly defined, IMS is an architectural framework for delivering Internet Protocol (IP) multimedia services to mobile users defined by the standard body, 3rd Generation Partnership Project (3GPP). In one embodiment, a SBC is a network element that provides the security boundary for the IMS network infrastructure. The SBC provides traffic controls, protocol verification, protocol conversion, hosted NAT, session managed media anchor or release, and records CDR events. The SBC exposes its well known address(es) within the IMS network and is the first trusted element of the Service Provider network infrastructure. It includes the Proxy Call Session Control Function (P-CSCF) and Access Border Gateway (A-BGF) IMS functions as defined by 3GPP and other standards bodies.

In one embodiment, a Circuit Switched Gateway (CSG) is a network element that interconnects a circuit switched network, e.g., a Public Switched Telephone Network (PSTN) and a packet switched network, e.g., an IMS network. For example, the CSG network element performs the necessary conversion functions including, but not limited to, media and signaling protocol interworking, between a circuit switched network and an IMS core network.

Customer premise PBX 124 residing in an enterprise network 104 is connected to the IMS core network 103 via the SBC 123. The customer premise PBX 124 may communicate directly with the SBC 123 via flow 161 or via the PID 170.

Public Switched Telephone Network (PSTN) 102 is connected to the IMS core network 103 via the CSG 127. It should be noted that although the PID 170 is illustrated as being deployed between the SBC 123 and the PBX 124, the PID 170 could be deployed on either side of the SBC. Furthermore, it should be noted that the PID 170 could be a separate device as shown in FIG. 1 or could be integrated into the SBC 123. It should be noted that PID 170 is a service provider managed device.

In one embodiment, the enterprise customer of the enterprise network 104 has subscribed on behalf of the FMC users of the network devices 111 behind the PBX to the NB-FMC service provided by the IMS core network 103. In one embodiment, the PID 170 acts as a SIP Application Server (AS) interfacing with the IMS core network 103. The PID provides the necessary interworking between the service provider network and a customer premise PBX, that does not support a direct AS interface using Session Initiation Protocol (SIP), to facilitate the access of customer premise PBX service logic and data by the service provider network. Note that IMS Core Network 103 does not support a signaling interface that can be used to access PBX-based service logic and data. For example, PBX 124 can be a Time Division Multiplexing (TDM) PBX. Therefore, PID 170 is required to facilitate such communications.

It should be noted that the PID 170 and other network devices can be implemented using any number of general processing devices, e.g., as shown in FIG. 4 below. In other words, the functions as performed by the PID 170 as discussed below can be implemented in any general processing devices.

In one embodiment, mobile device 110, e.g., an NB-FMC device, is registered with the Internet Protocol Multimedia Subsystem (IMS) core network 103 and the user related information is stored in both the IMS core network 103 and on the customer premise PBX 124 to provide integrated NB-FMC service features to mobile device 110.

To illustrate, the user of the mobile device 110, who is associated with the enterprise network 104 (e.g., an employee associated with the enterprise that operates the enterprise network), may want the same service features that are currently available from the customer premise PBX 124 to be made available to the mobile device 110. Furthermore, the user may also want access to the network-based service features currently provided by the IMS core network 103 to the customer premise-based PBX. In other words, mobile user wants access to both the same customer premise-based PBX and network-based service features that are available when using their wireline device.

In one example, the user of mobile device 110 may originate a call by dialing an extension (e.g., a phone number with a configurable number of digits, typically 4 to 5 digits) of another employee in the same enterprise. Mobile core network 101 recognizes this call as an originating NB-FMC call and performs the processing required to assign a temporary routing number to this request to route it to the IMS Core 103 for originating service feature processing using flow 151. When the call request reaches the CSG 122, a Session Initiation Protocol (SIP) INVITE message is created and sent to the Interrogating Call Session Control Function 130.

Broadly defined, a Call Session Control Function (CSCF) network element is an IP Multimedia Services (IMS) based session control layer network element that is responsible for call session setup, mid-session control, and teardown. In particular, an Interrogating CSCF (I-CSCF) is a network element that provides topology hiding and helps to forward requests between a CSG and a Serving CSCF (S-CSCF) network element as well as Application Servers (AS). A Serving CSCF (S-CSCF) is a network element that provides session control, call signaling routing to applications, and SIP registrar functions. An Application server (AS) is a network element that hosts and executes service specific applications on behalf of an IMS core network, and interfaces with the S-CSCF using a communication protocol, e.g., a Session Initiation Protocol (SIP).

Continuing with the above example, in accordance with standard IMS core processing, the I-CSCF 130 sends the INVITE message to the AS 125 using flow 152 to replace the temporary routing number with the original extension number dialed by the user of mobile device 110, and returns a Public User Identifier (PUID) in the PAI field of the INVITE message that can be used to access the service profile for the originating FMC user. Then the AS 125 returns the modified INVITE message to the I-CSCF 130 using flow 152. The I-CSCF 130 continues standard IMS processing, and once it determines the S-CSCF 131 that should be accessed for originating processing, the I-CSCF 130 sends the INVITE message to the S-CSCF 131.

In accordance with standard IMS Core processing, the S-CSCF 131 determines, based on the service profile asserted by the mobile device 110, that SIP AS 126 needs to be accessed next. Thus, the S-CSCF 131 sends the INVITE message to the SIP AS 126 using flow 153 for call originating processing. Call originating processing at SIP AS 126 includes, but is not limited to, functions such as digit translation, call screening, time of day routing (based on information stored in IMS core network 103 for the identity asserted by mobile device 110). When the relevant processing is completed by the SIP AS 126, it will send the INVITE message back to the S-CSCF 131 using flow 153.

In order to provide service to a user who has service logic and data residing in the PBX, this method provides a solution that enables the network to access the PBX service logic and data during network processing. The S-CSCF 131 determines that the PID 170, which is acting as a SIP AS associated with the IMS core network 103, should be accessed by processing an Initial Filter Criteria (iFC) in a standard manner. S-CSCF 131 sends the INVITE message to the PID 170 via the SBC 123 over the PID AS interface using flow 154.

The PID 170 receives the SIP message from the IMS core network 103 and performs interworking functions for this message and all subsequent messages in order to access the PBX 124 when needed in a format that is compatible with the PBX 124. The PID 170 communicates with the PBX 124 as needed using flow 159.

The PBX 124 retrieves the service logic associated with the user. In this example, the FMC user dialed an abbreviated number which could not be translated in the network, but can be translated by information in the PBX 124. The PBX 124 translates the abbreviated number or provides information allowing the PID 170 to do so using flow 159. PID 170 then uses the information received to update/change the R-URI in the message that is being processed. The PID 170 then sends the updated INVITE message to the S-CSCF 131 using flow 154.

Eventually, the S-CSCF 131 determines that call originating processing is complete. Standard IMS Core processing follows and the call is set up to a user served by PSTN 102 via CSG 127 (using flow 155).

When the call is eventually answered, bearer path 160 will be established from the mobile access network 105 to the mobile core network 101 to the IMS core network 103 (via CSG 122) to the PSTN 102 (via CSG 127) without having to hairpin the bearer path through PBX 124. In other words, although the PBX 124 is capable of and was originally tasked with performing the digit translation function, it has been relieved of having to hairpin the bearer path 160 through the PBX 124. Namely, the digit translation logic and data was accessed from the PBX 124 without terminating bearer to it and in turn, acted upon by the IMS core network 103. This approach provides a significant amount of savings in terms of bandwidth since the bearer path does not need to traverse from the SBC 123 to the PBX 124 and then back from the PBX 124 to the SBC 123 (broadly defined as the hairpin).

It should be noted that the present invention also works with subsequent signaling messages after the INVITE message. For example, signaling could be routed through the PID 170 acting as a SIP AS. Based on any subsequent signaling, the PID 170 could determine that data or service logic in the PBX 124 needs to be accessed. This could be based on subsequent session setup signaling, mid-call signaling or session teardown signaling.

The benefits of the present invention shown in FIG. 1 can also be extended to calls originating from any existing wireline devices that are accessed via a customer premise PBX.

Figure 2:
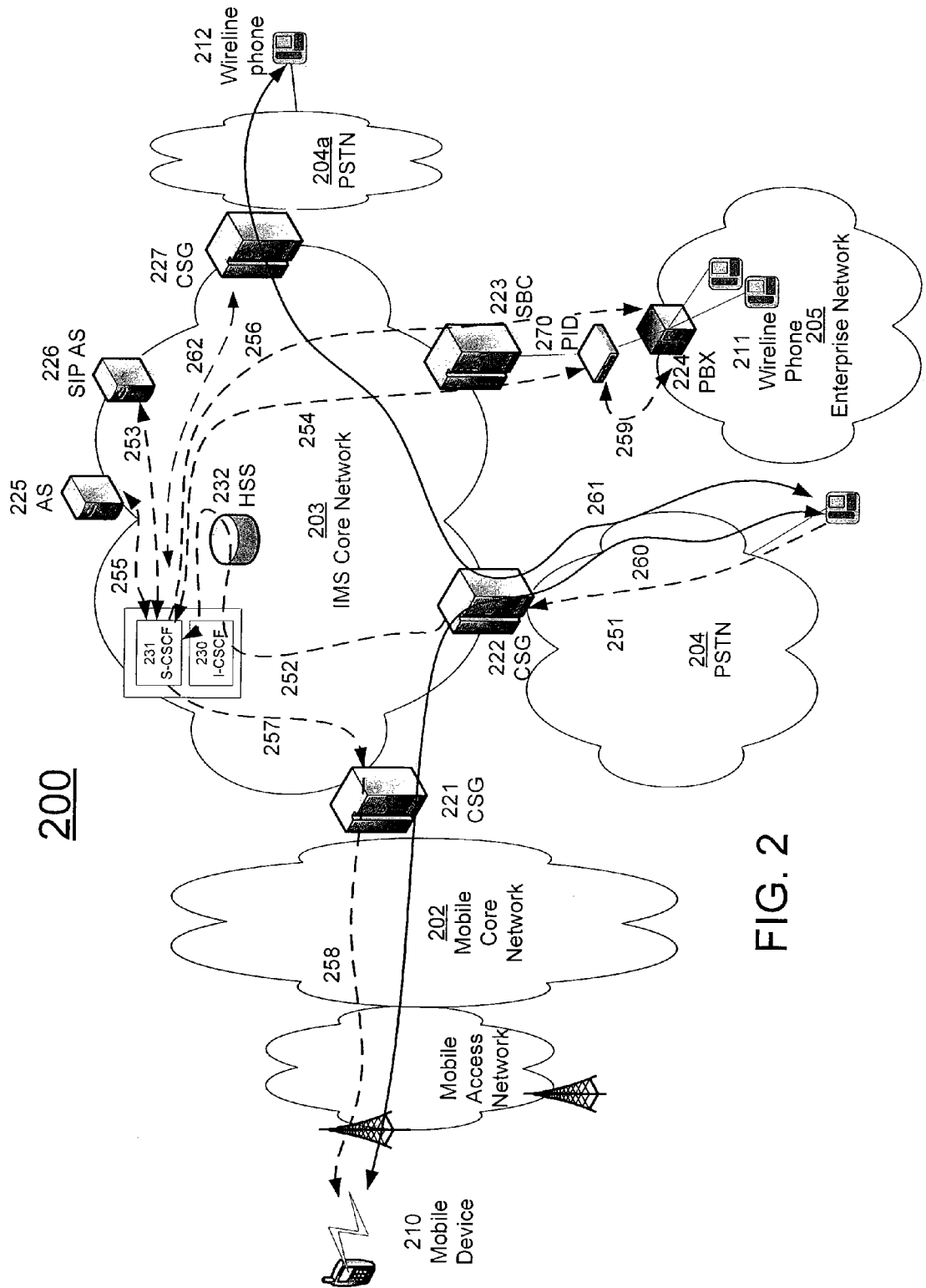
FIG. 2 illustrates an exemplary network for enabling customer premise PBX service feature processing in a service provider network using a PBX intermediary device in accordance with another embodiment of the present invention.

FIG. 2 illustrates an exemplary network 200 for enabling customer premise PBX service feature processing in a service provider network using a PBX intermediary device in accordance with one embodiment of the present invention. In FIG. 2, the PSTN 204 is connected to the IMS core network 203 via the CSG 222. PBX 224 residing in the enterprise network 205 is connected to the IMS core network 203 via the PID 270 and the SBC 223. The mobile core network 202 is connected to IMS core network 203 via CSG 221.

In one embodiment, the enterprise customer of the enterprise network 205 has subscribed on behalf of the FMC users behind the PBX 224 to the NB-FMC service with the IMS core network 203. For example, the PID 270 acts as an Application Server (AS) interfacing with the IMS core network 203 and the PBX 224. In one embodiment, the PID 270 acts as a SIP AS interfacing with the IMS Core Network 103. The PID 270 provides the necessary interworking between the service provider network and the customer premise PBX that does not support a direct AS interface to facilitate accessing customer premise PBX service logic and data by the service provider network. For example, the PBX 224 can be a Time Division Multiplexing (TDM) PBX or an Internet Protocol (IP) based PBX.

In one example, the identity asserted by the mobile device 210, an NB-FMC device, is registered with the Internet Protocol Multimedia Subsystem (IMS) core network 203 and the user related information is stored in both the IMS core network 203 and on the customer premise PBX 224 to provide integrated NB-FMC service features to the mobile device 210.

To illustrate, the user of mobile device 210, who is associated with the enterprise network 205 (e.g., an employee associated with the enterprise that operates the enterprise network), may want the service features available from the customer premise PBX 224 to be made available on the mobile device 210. Furthermore, the user may also want the PBX service features to be integrated with the NB-FMC service features provided by IMS core network 203. In other words, the network-based service features are not provided by the PBX 224.

In one example, an incoming call request is sent via the PSTN 204 to the CSG 222 using flow 251 and the call terminating processing is to be provided by the IMS core network 203. The called party number is a registered phone number associated with the PBX 224 by the S-CSCF.

In accordance with standard IMS processing, upon receiving the call request, the CSG 222 formulates a SIP INVITE message and sends it to the I-CSCF 230. If it comes in as a telephone number, the I-CSCF will do an ENUM dip to get a SIP-URI corresponding to that number. Then, I-CSCF 230 queries Home Subscriber Server (HSS) 232 to identify that S-CSCF 231 is associated with the SIP URI it received from ENUM and corresponding to the called party number. I-CSCF 230 sends the INVITE message to S-CSCF 231 for further processing. The series of processing flows is captured in flow 252.

Based on an initial Filtering Criteria (iFC), S-CSCF 231 sends the INVITE message to SIP AS 226 using flow 253 for call terminating processing, e.g., an incoming call screening feature that would not allow incoming calls of a particular type, or a feature that modifies a signaling parameter in accordance with customer requirements so that it is in a form that can be acted upon by the PBX. It should be noted that these are only illustrative call processing features. After the processing is completed, SIP AS 226 then sends the processed INVITE message back to S-CSCF 231 using flow 253.

In one embodiment, the S-CSCF 231 then sends the INVITE message to the PID 270, which is acting as a SIP AS associated with the IMS core network 203, via the SBC 223 using flow 254. The PID 270 receives the INVITE message from the IMS core network 203 and performs interworking functions for this message and all subsequent messages in order to access the PBX 224 when needed in a format that is compatible with the PBX 224. Flow 259 is used for the communication between PID 270 and PBX 224.

In one embodiment, the PBX 224 then performs the necessary local feature processing including, but not limited to, retrieving the local service logic and data residing in the PBX 224 that is applicable to the user. For example, PBX 224 may retrieve the service logic and data (e.g., a temporary call forwarding setting for the user) that is stored locally at the PBX 224 and then forwards the call forwarding information to the PID 270 using flow 259. In one embodiment, the PID 270 then uses the information provided by the PBX 224 to appropriately update the previously received INVITE message and then sends it to S-CSCF 231 using flow 254.

The S-CSCF 231 then sends the INVITE message (including the call forwarding information received from PID 270) to AS 225 using flow 255 for terminating NB-FMC processing and anchoring. AS 225 then sends the INVITE message containing the Request Uniform Resource Identifier (R-URI) =the called party number (including call forwarding information received from PID 270) to S-CSCF 231 using flow 255.

The S-CSCF 231 determines that the terminating processing is complete. Based on the registration information obtained by the S-CSCF 231, the S-CSCF 231 determines that normally the simultaneous ringing feature associated with the called party number should be provided to the mobile device 210 (e.g., a first endpoint device of the called party) using flows 257 and 258 as well as to the wireline phone 211 (e.g., a second endpoint device of the called party) using flow 256. However, based on the presence of the call forwarding information received from PID 270, the S-CSCF 231 determines that the simultaneous ringing feature associated with the called party number should be provided to the mobile device 210 (e.g., a first endpoint device of the called party) using flows 257 and 258 as well as to the Call Forwarding Number associated with wireline phone 212 served by PSTN Network 204a using flow 262 (e.g., the endpoint device to which the user's second wireline device is currently being forwarded).

Finally, the mobile device 210 answers the call and the bearer path 260 is established to complete the call request, or alternatively the user answers the call using the wireline phone 212 and the bearer path 261 is established to complete the call request. It should be noted that the bearer path 260 does not traverse through the PBX 224 at all when the call is answered by the mobile device 210. In addition, if the Call Forward device 212 answers the call and the bearer path 261 is established to the PSTN 204a via the CSG 227, the bearer path 261 does not traverse through the PBX 224. In other words, although the PBX 224 is capable of and was originally tasked with performing the Call Forwarding function on behalf of the user for their wireline device, it has been relieved of having to perform this function, thereby avoiding the need to hairpin the bearer path 261 through the PBX 224. Namely, the call forwarding information was accessed from the PBX 224 and in turn, implemented by the IMS core network 203. This approach provides a significant amount of savings in terms of bandwidth since the bearer path does not need to traverse from the SBC 223 to the PBX 224 and then back from the PBX 224 to the SBC 223 (broadly defined as the hairpin).

Figure 3:
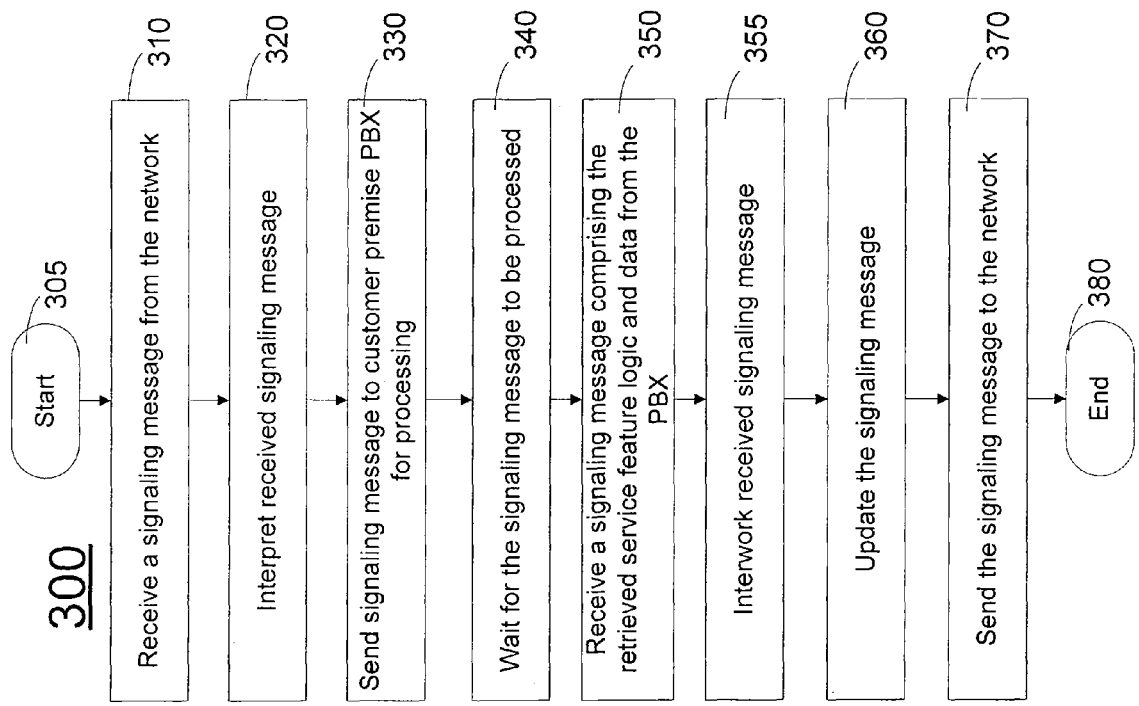
FIG. 3 illustrates a flowchart of a method of enabling customer premise PBX service feature processing to be performed in a service provider network using a PBX intermediary device of the present invention.

FIG. 3 illustrates a flowchart of an illustrative method 300 for enabling customer premise PBX service feature processing to be implemented in a service provider network using a PBX intermediary device of the present invention. For example, one or more steps of method 300 can be implemented by a PID serving a corresponding customer premise PBX. In one embodiment, the interface between the network and the PID is broadly referred to as a "network side interface", e.g., a SIP AS interface, such as based on the IMS Service Control (ISC) interface from the 3GPP standards. The PID stays in the signaling path for the duration of the call. Method 300 starts in step 305 and proceeds to step 310.

In step 310, the method receives a SIP message, e.g., a SIP INVITE call request message, to be processed from the network via the network side interface. The SIP message can be a call originating portion of SIP signaling or a call terminating portion of SIP Signaling.

In step 320, the method interprets that the message it has received means that something must be done. This is sometimes called a trigger. In order to do what the PID is programmed to do based on the trigger, the PID may need information or service logic that is resident in the PBX. Therefore, it will formulate a message (query) in a format (broadly a PBX signaling format) that is compatible with the PBX being served by the PID. Note that the PBX does not support an interface that can communicate with the network directly and relies on the PID to facilitate such communications. For example, if a PBX uses Integrated Service Digital Network (ISDN) Primary Rate Interface (PRI), then the PID is responsible for using a protocol understood by the PBX, such as ISDN PRI signaling protocol. In addition to ISDN PRI signaling protocol, the PBX may also use the Primary Rate Interface (PRI) signaling protocol, the Channel Associated Signaling (CAS) signaling protocol, a non-standard SIP signaling protocol, or even proprietary signaling protocols. In these cases, the PID is responsible for using the signaling protocol used by the PBX. Broadly, step 320 can be viewed as a trigger recognition step followed by a request where the method provides interworking.

In step 330, the method sends the signaling message to the corresponding PBX that is tasked with processing the request.

In step 340, the method waits for the previously sent signaling message to be processed by the PBX. For example, after retrieving the local service logic and data, the PBX sends the local service logic and data relevant to the request to the PID serving the PBX. For example, if the retrieved service logic and data is used for call forwarding a request to a specific destination phone number, then the call forwarding service logic and phone number will be sent to the PID for processing.

In step 350, the method receives a signaling message comprising the retrieved PBX service logic and data from the PBX being served.

In step 355, the method interworks the received signaling message from the PBX into a SIP signaling message. The method performs the service logic necessary and uses the retrieved service logic and data. This could involve setting up separate sessions and other tasks. When completed the PID, as a SIP AS, will either return the SIP message it received (perhaps modified) to the S-CSCF or it will send a response to the S-CSCF to the SIP message it received.

In step 360, the method updates the previously received INVITE message incorporating the retrieved PBX service logic and data from the PBX. For example, this would enable the network to access a subsequent AS from the network that will perform further service processing needed. However, it should be noted that other actions may be taken by the PID at this stage, e.g., sending a response to the S-CSCF with respect to the signaling message that it received, or establishing other sessions. If the signaling message is not updated, and other actions are taken, than step 360 can be perceived as an optional step.

In step 370, the method sends the SIP signaling message, e.g., an updated INVITE message or a response, e.g., a bye message to the network for further processing. The method ends in step 380.

It should be noted that although not specifically specified, one or more steps of methods 300 may include a storing, displaying and/or outputting step as required for a particular application. In other words, any data, records, fields, and/or intermediate results discussed in the methods 300 can be stored, displayed and/or outputted to another device as required for a particular application.

FIG. 4 depicts a high level block diagram of a general purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for providing a PBX intermediary device, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 405 for providing a PBX intermediary device can be loaded into memory 404 and executed by processor 402 to implement the functions as discussed above. As such, the present process 405 for providing a PBX intermediary device (including associated data structures) of the present invention can be stored on a computer readable storage medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for processing a signaling message, comprising:
receiving a signaling message by an intermediary device managed by a service provider of a communication network, where the signaling message requires processing by a customer premises public branch exchange, wherein the signaling message is in accordance with a network signaling format;
interworking, by the intermediary device, the signaling message into an interworked signaling message in accordance with a public branch exchange signaling format; and
sending, by the intermediary device, the interworked signaling message to the customer premises public branch exchange to retrieve service logic and data associated with the signaling message, wherein the service logic and data are associated with a service that is to be provided by the communication network without a bearer path being established to the customer premises public branch exchange.

2. The method of claim 1, further comprising:
receiving a second signaling message in accordance with the public branch exchange signaling format comprising the service logic and data from the customer premises public branch exchange.

3. The method of claim 2, further comprising:
interworking the second signaling message in accordance with the public branch exchange signaling format comprising the service logic and data into an updated signaling message, wherein the updated signaling message is in accordance with the network signaling format.

4. The method of claim 3, further comprising:
sending the updated signaling message by the intermediary device to another network element of the communication network.

5. The method of claim 4, wherein the service logic and data are for a customer premises public branch exchange based service feature.

6. The method of claim 5, wherein the customer premises public branch exchange based service feature is implemented by the communication network.

7. The method of claim 3, wherein the updated signaling message comprises a session initiation protocol invite message incorporating the service logic and data.

8. The method of claim 1, wherein the communication network comprises an internet protocol multimedia subsystem network.

9. The method of claim 1, wherein the signaling message comprises a call originating call request.

10. The method of claim 1, wherein the network signaling format comprises a session initiation protocol.

11. The method of claim 10, wherein the signaling message comprises a session initiation protocol invite signaling message.

12. The method of claim 1, the customer premises public branch exchange comprises a time division multiplexing based public branch exchange.

13. The method of claim 1, wherein the signaling message comprises a call terminating call request.

14. A tangible computer-readable medium storing instructions which, when executed by a processor of an intermediary device, cause the processor to perform operations for processing a signaling message, the operations comprising:
receiving a signaling message by the intermediary device managed by a service provider of a communication network, where the signaling message requires processing by a customer premises public branch exchange, wherein the signaling message is in accordance with a network signaling format;
interworking the signaling message into an interworked signaling message in accordance with a public branch exchange signaling format; and
sending the interworked signaling message to the customer premises public branch exchange to retrieve service logic and data associated with the signaling message, wherein the service logic and data are associated with a service that is to be provided by the communication network without a bearer path being established to the customer premises public branch exchange.

15. The tangible computer-readable medium of claim 14, further comprising:
receiving a second signaling message in accordance with the public branch exchange signaling format comprising the service logic and data from the customer premises public branch exchange.

16. The tangible computer-readable medium of claim 15, further comprising:
interworking the second signaling message in accordance with the public branch exchange signaling format comprising the service logic and data into an updated signaling message, wherein the updated signaling message is in accordance with the network signaling format.

17. The tangible computer-readable medium of claim 16, further comprising:
sending the updated signaling message by the intermediary device to another network element of the communication network.

18. The tangible computer-readable medium of claim 17, wherein the service logic and data are for a customer premises public branch exchange based service feature.

19. The tangible computer-readable medium of claim 17, wherein the customer premises public branch exchange based service feature is implemented by the communication network.

20. A system for processing a signaling message, comprising:
a processor of an intermediary device managed by a service provider of a communication network; and
a computer-readable medium storing instructions which, when executed by the processor, cause the processor to perform operations, the operations comprising:
receiving a signaling message, where the signaling message requires processing by a customer premises public branch exchange, wherein the signaling message is in accordance with a network signaling format;
interworking the signaling message into an interworked signaling message in accordance with a public branch exchange signaling format;
and sending the interworked signaling message to the customer premises public branch exchange to retrieve service logic and data associated with the signaling message, wherein the service logic and data are associated with a service that is to be provided by the communication network without a bearer path being established to the customer premises public branch exchange.

* * * * *